US012472489B2

(12) United States Patent
Dong et al.

(10) Patent No.: US 12,472,489 B2
(45) Date of Patent: Nov. 18, 2025

(54) CATALYST GRANULES USED IN OLEFIN DISPROPORTIONATION REACTION AND PREPARATION METHOD THEREFOR

(71) Applicants: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

(72) Inventors: Jing Dong, Shanghai (CN); Su Liu, Shanghai (CN); Yangdong Wang, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

( * ) Notice: Subject to any disclaimer, the term of this patent is extended or adjusted under 35 U.S.C. 154(b) by 175 days.

(21) Appl. No.: 18/249,649

(22) PCT Filed: Oct. 19, 2021

(86) PCT No.: PCT/CN2021/124570
§ 371 (c)(1),
(2) Date: Apr. 19, 2023

(87) PCT Pub. No.: WO2022/083566
PCT Pub. Date: Apr. 28, 2022

(65) Prior Publication Data
US 2023/0390750 A1    Dec. 7, 2023

(30) Foreign Application Priority Data
Oct. 20, 2020    (CN) .......................... 202011126304.4

(51) Int. Cl.
*B01J 35/40*    (2024.01)
*B01J 21/08*    (2006.01)
(Continued)

(52) U.S. Cl.
CPC ............... *B01J 35/19* (2024.01); *B01J 21/08* (2013.01); *B01J 21/10* (2013.01); *B01J 21/12* (2013.01);
(Continued)

(58) Field of Classification Search
None
See application file for complete search history.

(56) References Cited

U.S. PATENT DOCUMENTS 5,243,120 A    9/1993   Slaugh
5,898,091 A    4/1999   Chodorge et al.
(Continued)

FOREIGN PATENT DOCUMENTS

CN    103030508 A    4/2013
CN    103664456 A    3/2014
(Continued)

OTHER PUBLICATIONS

Chen, Mintao; "Non-official ranslation: Research on Preparing Nano-Magnesium Hydroxide and Specially Shaped Nano-Magnesium Oxide from Dolomite", Chinese Master's Theses Full-Text Database; Jun. 30, 2007; pp. 19-39.

*Primary Examiner* — Tam M Nguyen
(74) *Attorney, Agent, or Firm* — NKL Law; Allen Xue

(57) ABSTRACT

An integrated catalyst can be used in an olefin disproportionation reaction. The integrated catalyst contains a plurality of different integrated active phases. The relative positions among different active phases remain substantially unchanged during the olefin disproportionation reaction. The effective distance between respective bisecting planes
(Continued)

of two adjacent different active phases is 0.5-5 mm, preferably 1-3 mm.

26 Claims, 3 Drawing Sheets

(51) Int. Cl.
    *B01J 21/10* (2006.01)
    *B01J 21/12* (2006.01)
    *B01J 23/02* (2006.01)
    *B01J 23/30* (2006.01)
    *B01J 29/03* (2006.01)
    *B01J 29/78* (2006.01)
    *B01J 35/00* (2006.01)
    *B01J 35/55* (2024.01)
    *B01J 37/00* (2006.01)
    *B01J 37/02* (2006.01)
    *B01J 37/03* (2006.01)
    *B01J 37/04* (2006.01)
    *B01J 37/06* (2006.01)
    *B01J 37/08* (2006.01)
    *C07C 6/04* (2006.01)

(52) U.S. Cl.
    CPC ............... *B01J 23/02* (2013.01); *B01J 23/30* (2013.01); *B01J 29/0341* (2013.01); *B01J 29/78* (2013.01); *B01J 35/40* (2024.01); *B01J 35/55* (2024.01); *B01J 37/0018* (2013.01); *B01J 37/0236* (2013.01); *B01J 37/031* (2013.01); *B01J 37/04* (2013.01); *B01J 37/06* (2013.01); *B01J 37/088* (2013.01); *C07C 6/04* (2013.01); *B01J 2235/00* (2024.01); *B01J 2235/30* (2024.01); *C07C 2523/30* (2013.01)

(56) References Cited

U.S. PATENT DOCUMENTS

| | | | |
|---|---|---|---|
| 6,166,279 | A | 12/2000 | Schwab et al. |
| 6,358,482 | B1 | 3/2002 | Chodorge et al. |
| 6,586,649 | B1 | 7/2003 | Botha et al. |
| 6,743,958 | B2 | 6/2004 | Commereuc et al. |
| 2017/0326494 | A1* | 11/2017 | Gebald ............. B01J 20/28052 |
| 2018/0208526 | A1 | 7/2018 | Alshafei et al. |
| 2022/0193598 | A1* | 6/2022 | Suter ................... B01D 53/0438 |
| 2023/0390693 | A1* | 12/2023 | Cizeron ............ B01D 53/0423 |
| 2024/0001284 | A1* | 1/2024 | Cully ................ B01D 53/0476 |
| 2024/0189755 | A1* | 6/2024 | Cully ................ B01D 53/0438 |

FOREIGN PATENT DOCUMENTS

| | | |
|---|---|---|
| CN | 104528775 A | 4/2015 |
| CN | 104557418 A | 4/2015 |
| CN | 107970916 A | 5/2018 |
| JP | 86261639 A | 3/1987 |
| WO | 00014038 A1 | 3/2000 |

\* cited by examiner

CATALYST GRANULES USED IN OLEFIN DISPROPORTIONATION REACTION AND PREPARATION METHOD THEREFOR

TECHNICAL FIELD

The invention relates to catalyst particles for olefin disproportionation reaction, a preparation process thereof and use of the catalyst particles in the field of olefin disproportionation.

BACKGROUND

Olefin disproportionation is a process by which the C=C double bond in an olefin is broken and recombined under the action of a transition metal compound catalyst to obtain a new olefin product.

Olefin disproportionation technology is one of the effective technical means for regulating the structure of the product. By utilizing a cross disproportionation of the butylene and the ethylene, a proper amount of ethylene can be added, to convert the relatively excessive amount of butylene raw material with low value into a propylene product with high value.

The catalyst for butylene disproportionation mainly comprises rhenium-based, molybdenum-based and tungsten-based catalysts. U.S. Pat. Nos. 5,898,091 and 6,166,279 disclose treatment methods for $C_4$ and $C_5$ olefins, wherein in the process of preparing propylene by olefin disproportionation, the catalyst used is $Re_2O_7/Al_2O_3$, and the reactor is a moving bed. U.S. Pat. No. 6,358,482 discloses a device for the production of isobutylene and propylene from $C_4$ hydrocarbon fraction. $C_4$ fraction can provide 1-butylene and 2-butylene from selective hydrogenation and rectification, the separated 1-butylene is converted into 2-butylene through isomerization of the double-bond, and the 2-butylene rich material is subjected to disproportionation with ethylene to produce propylene, where the disproportionating catalyst is $Re_2O_7/Al_2O_3$. U.S. Pat. No. 6,743,958 discloses a process improved based on U.S. Pat. No. 6,358,482, where the isobutylene separated is subjected to isomerization of skeleton to produce n-butylene for recycle. WO00014038 introduces a method for preparing propylene by disproportionation of butylene, wherein the raw material butylene is 1-butylene, 2-butylene or a mixture thereof, and the catalyst is $WO_3/SiO_2$ or $WO_3/SiO_2$ modified with $Cs^+$, $PO_4^{3-}$ or the like.

At present, the catalyst for preparing propylene by olefin disproportionation uses a binary catalyst comprising two types of a disproportionation catalyst and an isomerization catalyst, wherein the isomerization catalyst usually uses an alkaline earth metal oxide, and the isomerization catalyst alone has no olefin disproportionation effect substantially. The current research shows that the activity and the stability of the lower olefin disproportionation catalyst can be effectively improved by a method of mixing particles of the both for filling.

SUMMARY OF THE INVENTION

The inventors of the invention find that in the disproportionation reaction, the migration of the intermediate allyl group between the two types of catalytic active phases has a large influence on the reaction, and the precise control of the distance between the two active phases needs to be considered in the design of the catalyst. In the prior art, the disproportionation catalyst particles and the isomerization catalyst particles are simply mixed and then used for butylene disproportionation reaction, where the both catalysts are combined in a disordered manner, so that the distance between the two active phases cannot be accurately controlled, the generation and migration of the intermediate are not benefited, and the catalyst efficiency is reduced under a high space velocity condition. Meanwhile, a catalyst obtained from simply mixing the two types of catalyst particles shows lower catalytic efficiency, and the performance is reduced possibly because the two active phases are covered by each other due to too close distance. Therefore, the present inventors have studied and tested to provide a novel catalyst in which the disproportionation catalyst and the isomerization catalyst are integrated into integrated catalyst particles by changing the mode of mixing particles. The integrated catalyst can accurately control the distance between the two active phases, which not only is beneficial to the migration of intermediates, but also can avoid the reduction of activity stability caused by the mutual coverage of active sites due to the too close distance between the two types of catalysts, and can improve the activity and stability of the catalyst under the working condition of high space velocity. Meanwhile, the isomerization catalyst used is ensured to be magnesium oxide in the form of polycrystalline hexagonal flakes, which morphology structure can fully expose the active sites of the isomerization catalyst, improve the utilization rate of the isomerization catalyst and be beneficial to prolonging the stability of the catalyst.

Accordingly, aiming at the problem of relatively inferior activity and stability of a catalyst obtained from mechanically mixing olefin disproportionation catalysts and isomerization catalysts when being used in the disproportionation reaction of lower olefins in the prior art, the invention provides novel catalyst particles for the olefin disproportionation reaction and a preparation process and use thereof.

All publications, patent applications, patents, and other references mentioned in this specification are herein incorporated by reference in their entirety. Unless defined specifically, all technical and scientific terms used herein have the same meaning as commonly understood by those skilled in the art to which this invention belongs. In case of conflict, the present specification, including definitions, will control.

All ranges involved herein are inclusive of their endpoints unless specifically stated otherwise. Further, when a range, one or more preferred ranges, or a plurality of preferable upper and lower limits, are given for an amount, concentration, or other value or parameter, it is to be understood that all ranges formed from any pair of any upper limit or preferred values thereof and any lower limit or preferred values thereof are specifically disclosed, regardless of whether such pairs of values are individually disclosed.

In the present invention, when a technical solution is given in an open-ended limited form such as "comprising", "including" some listed elements, it will be understood by those skilled in the art that an embodiment consisting of, or consisting essentially of, these elements can be obviously used to implement the technical solution. Therefore, those skilled in the art will understand that the technical solution given in the present invention with the open limitation also covers the embodiments constituted by the enumerated elements, or substantially constituted by the enumerated elements.

Finally, all percentages, parts, ratios, etc. referred to in this specification are by weight unless explicitly stated otherwise; but where weight is not a basis according to conventional wisdom by those skilled in the art, the basis is determined by conventional wisdom by those skilled in the art.

"Ranges" as disclosed herein are given with lower and upper limits, e.g., one or more lower limits and one or more upper limits. A given range may be defined by selecting a lower limit and an upper limit that define the boundaries of the given range. All ranges defined in this manner are inclusive and combinable, i.e., any lower limit may be combined with any upper limit to form a range. For example, ranges of 60-110 and 80-120 are listed for particular parameters, meaning that ranges of 60-120 and 80-110 are also contemplated. Furthermore, if the lower limits listed are 1 and 2 and the upper limits listed are 3, 4 and 5, then the following ranges are all contemplated: 1-3, 1-4, 1-5, 2-3, 2-4, and 2-5.

For the purposes of the present invention, the "active phase" of a catalyst is understood to mean the structural units which are bound together and remain morphologically stable during storage and reaction.

It is known to those skilled in the art that disproportionation catalysts and/or isomerization catalysts are typically used in olefin disproportionation reactions. For the purposes of the present invention, it is therefore possible to use directly the commercially available disproportionation catalyst and isomerization catalyst as different active phases respectively in the integrated catalyst of the invention. Accordingly, for the purposes of the present invention, the terms "disproportionation catalyst" and "disproportionation active phase" may be used interchangeably as appropriate; and the terms "isomerization catalyst" and "isomerization active phase" may be used interchangeably as appropriate.

For the purposes of the present invention, an "integrated catalyst" comprises a plurality of different active phases integrated together, and the relative position between the different active phases remains substantially unchanged during the olefin disproportionation reaction; for example, during the olefin disproportionation reaction, the relative position displacement, if any, between the different active phases is not more than preferably not more than 0.1 mm.

For the purposes of the present invention, the "effective distance" of two adjacent active phases is intended to mean an average distance counted between the substances contained in each of two adjacent active phases, for the purpose of quantifying the average migration distance of the object to be catalyzed between the two adjacent active phases of the catalyst. It will be readily appreciated that for two adjacent distinct active phases A and B, there is an interface $S_0$ that is in planar or curved shape. It is also readily understood that inside said active phase A there is a bisecting surface $S_A$ in the form of a plane bisecting the mass of active phase A and parallel to the planar interface $S_0$, or a bisecting surface $S_A$ in the form of a curved surface equidistant from various points on the curved interface $S_0$; and correspondingly, inside the active phase B, there is a bisecting surface $S_B$. Thus, the distance between the bisecting surfaces $S_A$ and $S_B$ may represent the "effective distance" of the two adjacent different active phases A and B. For example, for a uniform cuboid, its bisecting surface is the cross-section at half its thickness; thus, when the active phases A and B are laminated together in the thickness direction in the form of cuboids, respectively, the "effective distance" between the active phases A and B is equal to half the sum of the thicknesses of the active phases A and B. For another example, for a uniform sphere with radius R1, the bisecting surface is the spherical surface which bisects the volume of the original sphere, i.e., the spherical surface at radius $$\frac{1}{\sqrt{2}} R1$$

(about 0.79R 1).

Thus, for the purposes of the present invention, the "thickness" of the catalyst particles generally means an orientation perpendicular to the interface $S_0$, and the planar orientation of the interface $S_0$ is referred to as the "radial" orientation, taking into account the shape of the reactor in which the catalyst is loaded, and the like. When the interface $S_0$ is not circular or cannot be described as circular, then the orientation of the larger scale is referred to as the "length".

Accordingly, for purposes of the present invention, the effective distance occupied by an active phase (e.g., active phase A) is the distance between the bisecting surface of the active phase (e.g., bisecting surface $S_A$) and the interface $S_0$ of the active phase with another active phase.

In one aspect, the present invention provides an integrated catalyst for olefin disproportionation, wherein the integrated catalyst comprises a plurality of different active phases integrated together, and the relative position between the different active phases is kept substantially unchanged during the olefin disproportionation; characterized in that the effective distance between the respective bisecting surfaces of two adjacent different active phases is 0.5-5 mm, and preferably 1-3 mm.

In one embodiment of the invention, the different active phases are integrated by means selected from the group consisting of: filling each active phase into a container with a plurality of chambers respectively; laminating the respective active phases; bonding the active phases; rolling the active phases in sequence; and coextruding the active phases.

In one embodiment of the present invention, the ratio of the effective distances occupied by two different active phases among the distances between the centers of gravity of two adjacent different active phases is 1:10 to 10:1.

In one embodiment of the invention, optionally, the plurality of different active phases are alternated one or more times in a periodic regular arrangement. For the purposes of the present invention, a periodic regular arrangement means that the arrangement of the different active phases exhibits a periodic regularity. For example, for two different active phases A and B, they are arranged in the form AB, BA, ABA, BAB, ABAB or BABA; whereas for e.g. three different active phases A, B and C, they are arranged in a form such as ABC, ABCABC, etc.

In one embodiment of the present invention, any two adjacent active phases are a disproportionation catalyst and an isomerization catalyst, respectively, and the ratio between the effective distances occupied by each of the adjacent disproportionation catalyst active phase and isomerization catalyst active phase is (1:1) to (1:5), preferably (1:2) to (1:3).

In one embodiment of the invention, the relative position displacement, if any, between the different active phases during the olefin disproportionation reaction is not more than 0.5 mm, preferably not more than 0.1 mm.

In one embodiment of the invention, the catalyst is in the form of particles.

In one embodiment of the invention, the catalyst particle has a total thickness of from 2.0 mm to 8.0 mm, preferably from 2.5 mm to 6.0 mm; a radial length of 1.8 mm to 6.0 mm, and preferably a cylindrical shape.

Accordingly, the present invention provides, in one exemplary embodiment, catalyst particles for olefin disproportionation reaction, the catalyst particles having a multilayer structure of at least two layers, any two adjacent layers being a disproportionation catalyst layer and an isomerization catalyst layer, respectively, and the thickness ratio of the adjacent disproportionation catalyst layer and isomerization catalyst layer being (1:1) to (1:5), preferably (1:2) to (1:3).

In one embodiment of the invention, the catalyst particles have a total thickness of from 2.5 mm to 6.0 mm and a radial length of from 1.8 mm to 6.0 mm.

In one embodiment of the invention, the catalyst particles may be of a cylindrical shape, preferably straight cylindrical shape. The cylinder can have a diameter of 1.8 mm-6.0 mm, and a height of 2.5 mm-6.0 mm. In the multilayer structure, each layer is a coaxial cylinder with the equal bottom surface area.

In one embodiment of the present invention, the catalyst particles have a two-layer structure or a three-layer structure. The two-layer structure is composed of a disproportionation catalyst layer and an isomerization catalyst layer. The three-layer structure is composed of a first disproportionation catalyst layer, an isomerization catalyst layer and a second disproportionation catalyst layer in sequence, or is composed of a first isomerization catalyst layer, a disproportionation catalyst layer and a second isomerization catalyst layer.

In one embodiment of the present invention, the disproportionation catalyst is a tungsten-based catalyst, preferably comprising the following components in parts by weight:
(1) 85-95 parts of a carrier, and
(2) 5-15 parts of tungsten oxide.

In one embodiment of the present invention, preferably, the support is at least one selected from the group consisting of $SiO_2$ and a mesoporous molecular sieve. The mesoporous molecular sieve is silicon-containing mesoporous molecular sieve, and is at least one selected from the group consisting of MCM molecular sieve, SBA molecular sieve, HMS molecular sieve and MSU molecular sieve; more preferably, it is selected from the group consisting of MCM molecular sieve, SBA molecular sieve, HMS molecular sieve and MSU molecular sieve.

In one embodiment of the present invention, the disproportionation catalyst may be prepared by a method commonly used in the art, such as impregnation. Generally, a disproportionation catalyst is obtained by drying and calcining processes after a support is impregnated with a supported tungsten source. The drying and calcining are carried out under conventional operating conditions, such as drying at 80-120° C. for 1-10 h, and calcining at 400-600° C. for 2-7 h.

In one embodiment of the present invention, the isomerization catalyst is an alkaline earth metal oxide selected from at least one of calcium oxide, magnesium oxide, strontium oxide, and barium oxide; preferably magnesium oxide.

In one embodiment of the invention, the magnesium oxide as isomerization catalyst is magnesia in the form of polycrystalline hexagonal flakes; preferably, the hexagon has a side length of 180-600 nm and a thickness of 8-30 nm.

In one embodiment of the present invention, the magnesium oxide is prepared by a process comprising:
1) preparing a solution of soluble magnesium salt with a concentration of 5-20%, heating to 40-80° C. and stirring;
2) adding a surfactant and a complexing agent, wherein the molar ratio of the surfactant to magnesium ions is 0.5-3%, and the molar ratio of the complexing agent to the magnesium ions is 1-8%;
3) adding a precipitator, wherein the molar ratio of the precipitator to magnesium ions is 2:1-5:1;
4) washing the precipitate obtained in the step 3 with water, then washing with absolute ethanol, and drying at 70-90° C. for 8-12 h; and
5) calcining the product obtained in the step (4), controlling the heating rate to be ° C./min, and calcining at 400-520° C. for 3-6 h.

The soluble magnesium salt in the step 1) is at least one selected from magnesium sulfate, magnesium chloride and magnesium carbonate; the surfactant in the step 2) is at least one molecular surfactant, preferably at least one of polyethylene glycol and P123; the complexing agent is at least one selected from ethylenediamine tetraacetic acid and nitrilotriacetic acid; and in the step 3), the precipitator is at least one of aqueous ammonia and urea, at a concentration of 5-30%.

In one embodiment of the present invention, it is preferable that the weight ratio of the disproportionation catalyst to the isomerization catalyst in the catalyst particles is (1:1) to (1:12). More preferably, the weight ratio of the disproportionation catalyst to the isomerization catalyst is (1:1) to (1:10). The disproportionation catalyst refers to those disproportionation catalysts derived from all of the disproportionation catalyst layers, and the isomerization catalyst refers to those isomerization catalysts derived from all of the isomerization catalyst layers.

In another aspect, the present invention provides a process of preparing an integrated catalyst according to the present invention, comprising:
1) respectively providing powders of a plurality of different active phases;
2) respectively molding the powders of the plurality of different active phases from step 1) to form a plurality of active phases with stable structures; and
3) integrating the plurality of active phases together by a means selected from the group consisting of: filling each active phase into a container with a plurality of chambers respectively; laminating the respective active phases; bonding the respective active phases; rolling the active phases in sequence; or co-extruding the active phases; wherein, the effective distance between the respective bisecting surfaces of two adjacent different active phases is controlled to be 0.5-5 mm, and preferably 1-3 mm.

In one embodiment of the present invention, the particle size of the powders is 8 to 400 mesh.

Accordingly, in one exemplary embodiment, the present invention provides a process of preparing the above catalyst particles, comprising:
1) respectively preparing disproportionation catalyst powders and isomerization catalyst powders;
2) molding one type of the powders obtained from step 1) to prepare a catalyst layer A;
3) combining a catalyst layer B formed by another type of powders in the step 1) on one bottom surface of the catalyst layer A;
4) optionally, using the method of step 3), combining other catalyst layer(s) on the basis of the two-layer catalyst particles compact obtained in step 3); and
5) drying and calcining the finally obtained catalyst particles compact to obtain the catalyst particles.

In the step 1), the particle size of the disproportionation catalyst powder is 8-50 meshes, and the particle size of the isomerization catalyst powder is 8-50 meshes.

When the one type of powders obtained from step 1), which is used in the step 2), is a disproportionation catalyst powder, the other type of powders in the step 3) is an isomerization catalyst powder. When the one type of powder obtained from step 1), which is used in the step 2), can be an isomerization catalyst powder, the other type of powder in the step 3) is a disproportionation catalyst powder.

The molding method for the catalyst layer A in the step 2) may be a tabletting molding process.

The molding method for the catalyst layer B in the step 3) can be a tabletting molding process, namely, another type of powders from step 1) is tableted and molded on one bottom surface of the catalyst layer A to form the catalyst layer B bonded with the catalyst layer A. When the step 4) is not carried out, the catalyst particles compact obtained in the step 3) is the finally obtained catalyst particles compact.

The molding method for the other catalyst layers in the step 4) may be a tabletting molding process, namely molding the other catalyst layers combined together by utilizing the same tabletting forming process as the step 3) according to the requirements that any two adjacent layers are respectively a disproportionation catalyst layer and an isomerization catalyst layer, so as to obtain the finally obtained catalyst particles compact.

According to the invention, "optionally" means that the corresponding step is carried out or not.

The tabletting molding process according to the present invention is a process well known to those skilled in the art. The shape of the catalyst particles may be a shape conventionally used in the art, preferably a cylindrical shape, and more preferably a straight cylindrical shape. The catalyst particles are composed of a plurality of catalyst layers in the axial direction.

In one embodiment of the present invention, a first binder may be used during molding the disproportionation catalyst powders. The first binder is at least one selected from silica sol and aluminum sol. A second binder may be used during molding the isomerization catalyst powders. The second binder is at least one selected from polyvinyl alcohol, hydroxymethyl cellulose, hydroxypropyl methyl cellulose, hydroxypropyl cellulose and polyvinylpyrrolidone.

In one embodiment of the invention, the weight ratio of the disproportionation catalyst powder to the first binder is 3:1-1:2. The weight ratio of the isomerization catalyst powder to the second adhesive is 3:1-1:2.

In one embodiment of the present invention, after the catalyst particles compact satisfying the size requirement is obtained, the catalyst particles compact is subjected to a drying treatment and a calcination treatment. The step 5) is preferably carried out under conditions of: drying at a temperature of 80-110° C. for 8-15 hours. A preferred calcining process is as follows: controlling the heating rate to be 0.5-1.5° C./min in the whole process, raising the temperature from room temperature to 280-320° C. in an inert atmosphere, keeping the temperature for 4-8 h, raising again the temperature to 460-500° C., keeping temperature for 4-8 h, then shifting the atmosphere to an oxygen-containing atmosphere, raising the temperature to 530-570° C., keeping the temperature for 4-8 h, then shifting the atmosphere to the inert atmosphere again, and keeping the temperature for 4-8 h. The inert atmosphere may be at least one selected from nitrogen and inert gas. The oxygen-containing atmosphere may be an air atmosphere.

In a third aspect, the present invention provides a process for the disproportionation of olefins, using a fixed bed process, wherein the above catalyst particles or the catalyst particles obtained according to the above molding method are used.

In one embodiment of the invention, the method for the disproportionation of olefins comprises contacting a feedstock comprising ethylene and butylene or pentylene with the catalyst particles described above or catalyst particles prepared according to the above molding method to obtain a product comprising propylene.

In one embodiment of the present invention, the reaction conditions are preferably as follows: a reaction temperature of 200-450° C., a reaction pressure of 0-5 MPa, and a weight space velocity of the feedstock of 1-30 $h^{-1}$. Preferably, the reaction temperature is 250-400° C., the reaction pressure is 1-4 MPa, and the weight space velocity of the feedstock is 5-25 $h^{-1}$. Further preferably, the reaction temperature is 300-350° C., the reaction pressure is 2-3 MPa, and the weight space velocity of the feedstock is 10-20 $h^{-1}$.

Compared with the prior art, the invention has the following advantages:

1. The inventor researches and discovers that the disproportionation catalyst and the isomerization catalyst are layered and integrated into catalyst particles by changing the conventional mode of mechanical mixing the disproportionation catalyst and the isomerization catalyst in the prior art, which not only is beneficial to the migration of an intermediate, but also avoid the mutual coverage of active sites due to the close distance of the two catalysts, so as to improve the activity and the stability of the catalyst.

2. The inventor further researches and discovers that the catalyst has better activity and stability by comprehensively controlling the thickness ratio of the adjacent disproportionation catalyst layer and isomerization catalyst layer, the weight ratio of the disproportionation catalyst and the isomerization catalyst, and the like, and accurately controlling the distance between two types of active centers to be in a millimeter level.

3. Because the physical properties of the powder used by the disproportionation catalyst and the isomerization catalyst are different greatly, the contact interface of the disproportionation catalyst and the isomerization catalyst is easy to generate a fault phenomenon in the preparation process. The invention overcomes the problem of fault between each catalyst layer by controlling the processes of molding materials, calcining and the like, and further improves the activity and stability of the catalyst.

附图说明

DRAWINGS

Figure 1:
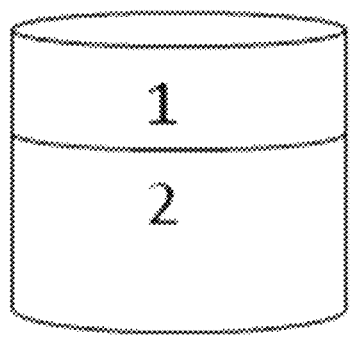
FIG. 1 shows a schematic view of the structure of two-layer catalyst particles (a disproportionation catalyst layer and an isomerization catalyst layer)

wherein the reference numerals are as follows:
1-a denotes a first disproportionation catalyst layer, 2-a denotes a first isomerization catalyst layer, 3-a denotes a second disproportionation catalyst layer, and 4-a denotes a second isomerization catalyst layer.

Figure 4:
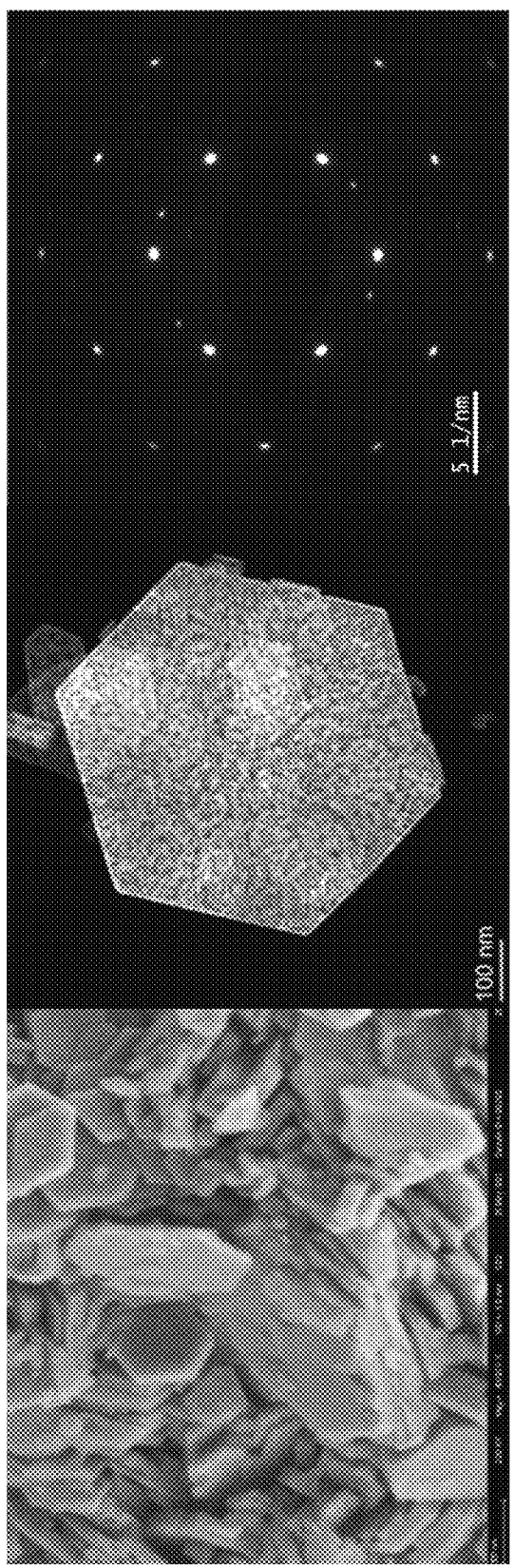
Figure 5:
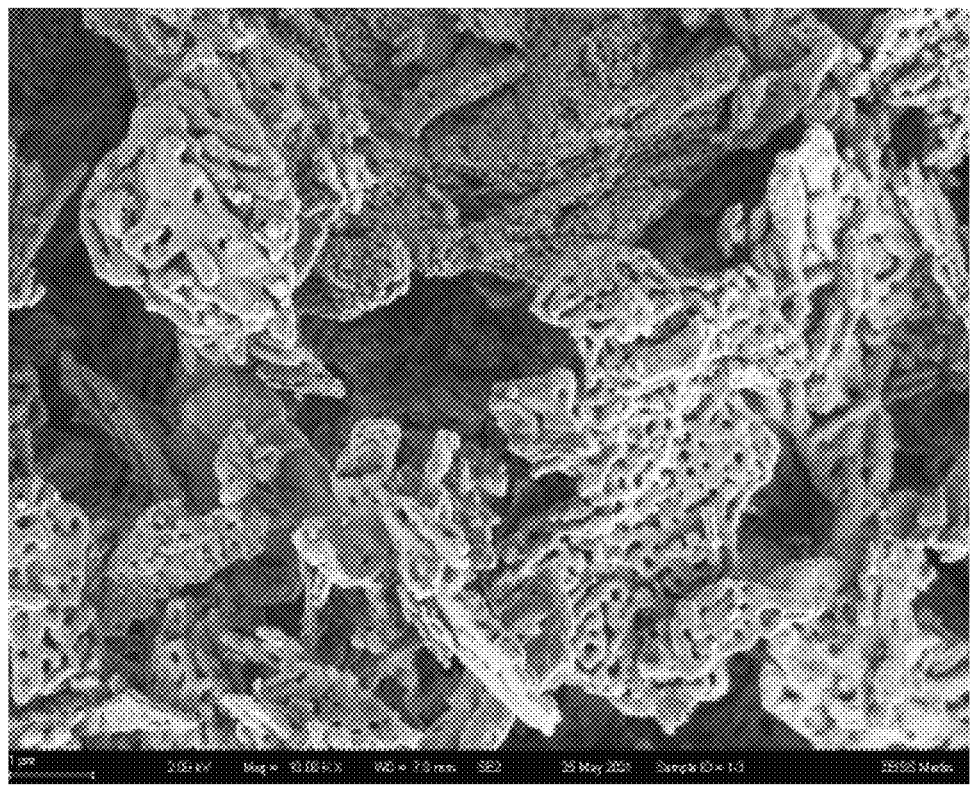

FIG. 4 shows SEM, TEM and electron diffraction photographs of magnesium oxide; and FIG. 5 shows an SEM photograph of magnesium oxide used in comparative example 3.

DETAILED DESCRIPTION

The present invention will be described in detail below with reference to Examples, but the scope of the present invention is not limited to the following description.

In the Examples of the present invention and the Comparative Examples, the disproportionation catalyst powder used had a particle size of 10-20 mesh; and the isomerization catalyst powder used had a particle size of 10-20 mesh.

The magnesium oxide used in the Examples of the invention was polycrystalline hexagonal flaky mesoporous magnesium oxide; prepared by:
1) preparing a solution of soluble magnesium salt with a concentration of 10%, heating to 60° C., and stirring;
2) adding polyethylene glycol and ethylene diamine tetraacetic acid, wherein the molar ratio of the surfactant to the magnesium ions was 1%, and the molar ratio of the complexing agent to the magnesium ions was 2%;
3) adding aqueous ammonia as a precipitator, wherein the molar ratio of the precipitator to magnesium ions was 3:1;
4) washing the precipitate obtained in the step 3 with water, washing with absolute ethanol, and drying at 80° C. for 8 hours;
5) calcining the product obtained in the step (4), controlling the heating rate to be 10° C./min, and calcining at 500° C. for 4 h.

Example 1

Disproportionation catalyst powders with a composition of $WO_3/SiO_2$ (wherein $WO_3$ was used in an amount of 15 wt %) was mixed with alumina sol at a weight ratio of 3:1 and granulated, tableted into a cylindrical catalyst layer A with diameter*height=1.8 mm*3.0 mm. Calcium oxide powders and polyvinyl alcohol were mixed at a weight ratio of 3:1, from which a cylindrical catalyst layer B was tableted and combined on one bottom surface of the catalyst layer A, to prepare a compact of cylindrical catalyst particles with 1.8 mm*6.0 mm, wherein the effective distance of active phases was 3 mm. The thickness ratio of the disproportionation catalyst layer A to the isomerization catalyst layer B was 1:1, and the weight ratio of the disproportionation catalyst to the isomerization catalyst was 1:6.

The catalyst particles compact was dried at a drying temperature of 90° C. for 10 hours and then calcined, where the calcination process was as follows: controlling the heating rate to be 0.5° C./min in the whole process, raising the temperature from room temperature to 280° C. in a nitrogen atmosphere, keeping the temperature for 4 h, raising again the temperature to 460° C., keeping temperature for 4 h, then shifting the atmosphere to an air atmosphere, raising the temperature to 530° C., keeping the temperature for 4 h, then shifting the atmosphere to the nitrogen atmosphere again, and keeping the temperature for 4 h, to obtain the catalyst particles.

The catalyst particles prepared were loaded in a fixed bed reactor of Φ25 mm, and ethylene and butylene were used as feedstocks for disproportionation under the conditions of a weight space velocity of 10 $h^{-1}$, a reaction temperature of 300° C., and a reaction pressure of 3 MPa, and the results were shown in Table 1.

Example 2

Disproportionation catalyst powders with a composition of $WO_3/SiO_2$ (wherein $WO_3$ was used in an amount of 5 wt %) was mixed with alumina sol at a weight ratio of 2:1 and granulated, tableted into a cylindrical catalyst layer A with 6.0 mm*1.0 mm. Barium oxide powders and hydroxymethyl cellulose were mixed at a weight ratio of 2:1, from which a cylindrical catalyst layer B was tableted and combined on one bottom surface of the catalyst layer A, to prepare a compact of cylindrical catalyst particles with 6.0 mm*6.0 mm, wherein the effective distance of active phases was 3 mm. The thickness ratio of the disproportionation catalyst layer A to the isomerization catalyst layer B was 1:5, and the weight ratio of the disproportionation catalyst to the isomerization catalyst was 1:6.

The catalyst particles compact was dried at a drying temperature of 90° C. for 10 hours and then calcined, where the calcination process was as follows: controlling the heating rate to be 1.5° C./min in the whole process, raising the temperature from room temperature to 320° C. in a nitrogen atmosphere, keeping the temperature for 8 h, raising again the temperature to 500° C., keeping temperature for 8 h, then shifting the atmosphere to an air atmosphere, raising the temperature to 570° C., keeping the temperature for 8 h, then shifting the atmosphere to the nitrogen atmosphere again, and keeping the temperature for 8 h, to obtain the catalyst particles.

The catalyst particles prepared were loaded in a fixed bed reactor of Φ25 mm, and ethylene and butylene were used as feedstocks for disproportionation under the conditions of a weight space velocity of 10 $h^{-1}$, a reaction temperature of 300° C., and a reaction pressure of 3 MPa, and the results were shown in Table 1.

Example 3

Disproportionation catalyst powders with a composition of $WO_3/MCM$-41 (wherein $WO_3$ was used in an amount of 10 wt %) was mixed with silica sol at a weight ratio of 1:1 and granulated, tableted into a cylindrical catalyst layer A with 3.0 mm*2.0 mm. Strontium oxide powders and polyvinylpyrrolidone were mixed at a weight ratio of 1:1, from which a cylindrical catalyst layer B was tableted and combined on one bottom surface of the catalyst layer A, to prepare a compact of cylindrical catalyst particles with 3.0 mm*6.0 mm, wherein the effective distance of active phases was 3 mm. The thickness ratio of the disproportionation catalyst layer A to the isomerization catalyst layer B was 1:2, and the weight ratio of the disproportionation catalyst to the isomerization catalyst was 1:6.

The catalyst particles compact was dried at a drying temperature of 90° C. for 10 hours and then calcined, where the calcination process was as follows: controlling the heating rate to be 1° C./min in the whole process, raising the temperature from room temperature to 300° C. in a nitrogen atmosphere, keeping the temperature for 6 h, raising again the temperature to 480° C., keeping temperature for 6 h, then shifting the atmosphere to an air atmosphere, raising the temperature to 550° C., keeping the temperature for 4 h, then shifting the atmosphere to the nitrogen atmosphere again, and keeping the temperature for 4 h, to obtain catalyst particles.

The catalyst particles prepared were loaded in a fixed bed reactor of Φ25 mm, and ethylene and butylene were used as feedstocks for disproportionation under the conditions of a weight space velocity of 10 $h^{-1}$, a reaction temperature of 300° C., and a reaction pressure of 3 MPa, and the results were shown in Table 1.

Example 4

Disproportionation catalyst powders with a composition of $WO_3/SBA$-15 (wherein $WO_3$ was used in an amount of 10 wt %) was mixed with silica sol at a weight ratio of 1:2 and granulated, tableted into a cylindrical catalyst layer A with 4.0 mm*1.0 mm. Magnesium oxide powders and hydroxypropyl cellulose were mixed at a weight ratio of 1:2, from which a cylindrical catalyst layer B was tableted and combined on one bottom surface of the catalyst layer A, to prepare a compact of cylindrical catalyst particles with 4.0 mm*2.5 mm, wherein the effective distance of active phases was 1.25 mm. The thickness ratio of the disproportionation catalyst layer A to the isomerization catalyst layer B was 1:1.5, and the weight ratio of the disproportionation catalyst to the isomerization catalyst was 1:6.

The catalyst particles compact was dried at a drying temperature of 90° C. for 10 hours and then calcined, where the calcination process was as follows: controlling the heating rate to be 1° C./min in the whole process, raising the temperature from room temperature to 300° C. in a nitrogen atmosphere, keeping the temperature for 6 h, raising again the temperature to 480° C., keeping temperature for 6 h, then shifting the atmosphere to an air atmosphere, raising the temperature to 550° C., keeping the temperature for 4 h, then shifting the atmosphere to the nitrogen atmosphere again, and keeping the temperature for 4 h, to obtain catalyst particles.

The catalyst particles prepared were loaded in a fixed bed reactor of Φ25 mm, and ethylene and butylene were used as feedstocks for disproportionation under the conditions of a weight space velocity of 10 h$^{-1}$, a reaction temperature of 300° C., and a reaction pressure of 3 MPa, and the results were shown in Table 1.

Example 5

Disproportionation catalyst powders with a composition of $WO_3$/MSU (wherein $WO_3$ was used in an amount of 10 wt %) was mixed with silica sol at a weight ratio of 1:2 and granulated, tableted into a cylindrical catalyst layer A with 4.0 mm*2.0 mm. Magnesium oxide powders and hydroxypropyl methylcellulose were mixed at a weight ratio of 1:2, from which a cylindrical catalyst layer B was tableted and combined on one bottom surface of the catalyst layer A, to prepare a compact of cylindrical catalyst particles with 4.0 mm*6.0 mm, wherein the effective distance of active phases was 3 mm. The thickness ratio of the disproportionation catalyst layer A to the isomerization catalyst layer B was 1:2, and the weight ratio of the disproportionation catalyst to the isomerization catalyst was 1:6.

The catalyst particles compact was dried at a drying temperature of 90° C. for 10 hours and then calcined, where the calcination process was as follows: controlling the heating rate to be 1° C./min in the whole process, raising the temperature from room temperature to 300° C. in a nitrogen atmosphere, keeping the temperature for 6 h, raising again the temperature to 480° C., keeping temperature for 6 h, then shifting the atmosphere to an air atmosphere, raising the temperature to 550° C., keeping the temperature for 4 h, then shifting the atmosphere to the nitrogen atmosphere again, and keeping the temperature for 4 h, to obtain catalyst particles, which, as shown in FIG. 1, was composed by a first disproportionation catalyst layer 1 (disproportionation catalyst layer A) and a first isomerization catalyst layer 2 (isomerization catalyst layer B).

The catalyst particles prepared were loaded in a fixed bed reactor of Φ25 mm, and ethylene and butylene were used as feedstocks for disproportionation under the conditions of a weight space velocity of 10 h$^{-1}$, a reaction temperature of 300° C., and a reaction pressure of 3 MPa, and the results were shown in Table 1.

Example 6

Disproportionation catalyst powders with a composition of $WO_3/SiO_2$ (wherein $WO_3$ was used in an amount of 10 wt %) was mixed with silica sol at a weight ratio of 1:2 and granulated, tableted into a cylindrical catalyst layer A with 3.0 mm*1.5 mm. Magnesium oxide powders and hydroxypropyl methylcellulose were mixed at a weight ratio of 1:2 and granulated, from which a cylindrical catalyst layer B was tableted and combined on one bottom surface of the catalyst layer A, to prepare an intermediate of cylindrical catalyst particles with 3.0 mm*4.5 mm, followed by further combining a disproportionation catalyst layer C with the same means, to obtain cylindrical catalyst particles compact with 3.0 mm*6.0 mm, wherein the effective distance of active phases was 2.25 mm. The thickness ratio of disproportionation catalyst layer A:isomerization catalyst layer B:disproportionation catalyst layer C was 1:2:1, at a weight ratio of 1:2:1.

Figure 3:
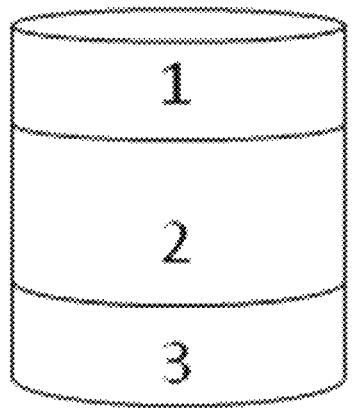
FIG. 3 shows a schematic structural view of three-layer catalyst particles (a first disproportionation catalyst layer, an isomerization catalyst layer, and a second disproportionation catalyst layer from top to bottom)

The catalyst particles compact was dried at a drying temperature of 90° C. for 10 hours and then calcined, where the calcination process was as follows: controlling the heating rate to be 1° C./min in the whole process, raising the temperature from room temperature to 300° C. in a nitrogen atmosphere, keeping the temperature for 6 h, raising again the temperature to 480° C., keeping temperature for 6 h, then shifting the atmosphere to an air atmosphere, raising the temperature to 550° C., keeping the temperature for 4 h, then shifting the atmosphere to the nitrogen atmosphere again, and keeping the temperature for 4 h, to obtain catalyst particles, which, as shown in FIG. 3, was composed by a first disproportionation catalyst layer 1 (disproportionation catalyst layer A), a first isomerization catalyst layer 2 (isomerization catalyst layer B) and a second disproportionation catalyst layer 3 (disproportionation catalyst layer C).

The catalyst particles prepared were loaded in a fixed bed reactor of Φ25 mm, and ethylene and butylene were used as feedstocks for disproportionation under the conditions of a weight space velocity of 10 h$^{-1}$, a reaction temperature of 300° C., and a reaction pressure of 3 MPa, and the results were shown in Table 1.

Example 7

Magnesium oxide powders and hydroxypropyl methylcellulose were mixed at a weight ratio of 1:2 and granulated, and tableted to prepare a cylindrical catalyst layer with 3.0 mm*2.4 mm. Disproportionation catalyst powders having a composition of $WO_3/SiO_2$ (wherein $WO_3$ was used in an amount of 10 wt %) was mixed with silica sol at a weight ratio of 1:2, from which a cylindrical catalyst layer B was tableted and combined on one bottom surface of the catalyst layer A, to prepare an intermediate of cylindrical catalyst particles with 3.0 mm*3.6 mm, followed by further combining an isomerization catalyst layer C with the same means, to obtain cylindrical catalyst particles compact with 3.0 mm*6.0 mm, wherein the effective distance of active phases was 1.8 mm. The thickness ratio of isomerization catalyst layer A:disproportionation catalyst layer B:isomerization catalyst layer C was 2:1:2, at a weight ratio of 5:1:5.

Figure 2:
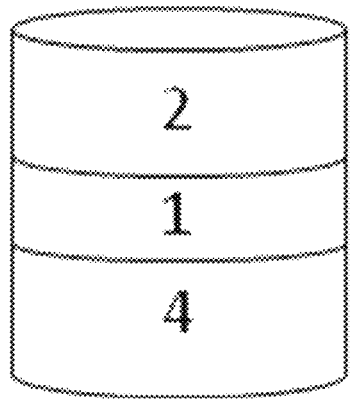
FIG. 2 shows a schematic view of the structure of three-layer catalyst particles (a first isomerization catalyst layer, a disproportionation catalyst layer and a second isomerization catalyst layer from top to bottom)

The catalyst particles compact was dried at a drying temperature of 90° C. for 10 hours and then calcined, where the calcination process was as follows: controlling the heating rate to be 1° C./min in the whole process, raising the temperature from room temperature to 300° C. in a nitrogen atmosphere, keeping the temperature for 6 h, raising again the temperature to 480° C., keeping temperature for 6 h, then shifting the atmosphere to an air atmosphere, raising the temperature to 550° C., keeping the temperature for 4 h, then shifting the atmosphere to the nitrogen atmosphere again, and keeping the temperature for 4 h, to obtain catalyst particles, which, as shown in FIG. 2, was composed by a first isomerization catalyst layer 2 (isomerization catalyst layer A), a first disproportionation catalyst layer 1 (disproportionation catalyst layer B) and a second isomerization catalyst layer 4 (isomerization catalyst layer C).

The catalyst particles prepared were loaded in a fixed bed reactor of Φ25 mm, and ethylene and butylene were used as feedstocks for disproportionation under the conditions of a weight space velocity of 10 h$^{-1}$, a reaction temperature of 300° C., and a reaction pressure of 3 MPa, and the results were shown in Table 1.

Example 8

Disproportionation catalyst powders with a composition of $WO_3/SiO_2$ (wherein $WO_3$ was used in an amount of 10 wt %) was mixed with silica sol at a weight ratio of 1:2 and granulated, tableted into a cylindrical catalyst layer A with 4.0 mm*2.0 mm. Magnesium oxide powders and hydroxypropyl methylcellulose were mixed at a weight ratio of 1:2, from which a cylindrical catalyst layer B was tableted and combined on one bottom surface of the catalyst layer A, to prepare a compact of cylindrical catalyst particles with 4.0 mm*6.0 mm, wherein the effective distance of active phases was 3 mm. The thickness ratio of the disproportionation catalyst layer A to the isomerization catalyst layer B was 1:2, and the weight ratio of the disproportionation catalyst to the isomerization catalyst was 1:2.

The catalyst particles compact was dried at a drying temperature of 90° C. for 10 hours and then calcined, where the calcination process was as follows: controlling the heating rate to be 1° C./min in the whole process, raising the temperature from room temperature to 300° C. in a nitrogen atmosphere, keeping the temperature for 6 h, raising again the temperature to 480° C., keeping temperature for 6 h, then shifting the atmosphere to an air atmosphere, raising the temperature to 550° C., keeping the temperature for 4 h, then shifting the atmosphere to the nitrogen atmosphere again, and keeping the temperature for 4 h, to obtain catalyst particles.

The catalyst particles prepared were loaded in a fixed bed reactor of Φ25 mm, and ethylene and butylene were used as feedstocks for disproportionation under the conditions of a weight space velocity of 10 h$^{-1}$, a reaction temperature of 300° C., and a reaction pressure of 3 MPa, and the results were shown in Table 1.

Example 9

Disproportionation catalyst powders with a composition of $WO_3/SiO_2$ (wherein $WO_3$ was used in an amount of 10 wt %) was mixed with silica sol at a weight ratio of 1:2 and granulated, tableted into a cylindrical catalyst layer A with 4.0 mm*2.5 mm. Magnesium oxide powders and hydroxypropyl methylcellulose were mixed at a weight ratio of 1:2, from which a cylindrical catalyst layer B was tableted and combined on one bottom surface of the catalyst layer A, to prepare a compact of cylindrical catalyst particles with 4.0 mm*wherein the effective distance of active phases was 2.5 mm. The thickness ratio of the disproportionation catalyst layer A to the isomerization catalyst layer B was 1:1, and the weight ratio of the disproportionation catalyst to the isomerization catalyst was 1:2.

The catalyst particles compact was dried at a drying temperature of 90° C. for 10 hours and then calcined, where the calcination process was as follows: controlling the heating rate to be 1° C./min in the whole process, raising the temperature from room temperature to 300° C. in a nitrogen atmosphere, keeping the temperature for 6 h, raising again the temperature to 480° C., keeping temperature for 6 h, then shifting the atmosphere to an air atmosphere, raising the temperature to 550° C., keeping the temperature for 4 h, then shifting the atmosphere to the nitrogen atmosphere again, and keeping the temperature for 4 h, to obtain catalyst particles.

The catalyst particles prepared were loaded in a fixed bed reactor of Φ25 mm, and ethylene and butylene were used as feedstocks for disproportionation under the conditions of a weight space velocity of 10 h$^{-1}$, a reaction temperature of 300° C., and a reaction pressure of 3 MPa, and the results were shown in Table 1.

Example 10

Disproportionation catalyst powders with a composition of $WO_3/SiO_2$ (wherein $WO_3$ was used in an amount of 10 wt %) was mixed with silica sol at a weight ratio of 1:2 and granulated, tableted into a cylindrical catalyst layer A with 4.0 mm*2.0 mm. Magnesium oxide powders and hydroxypropyl methylcellulose were mixed at a weight ratio of 1:2, from which a cylindrical catalyst layer B was tableted and combined on one bottom surface of the catalyst layer A, to prepare a compact of cylindrical catalyst particles with 4.0 mm*6.0 mm, wherein the effective distance of active phases was 3 mm. The thickness ratio of the disproportionation catalyst layer A to the isomerization catalyst layer B was 1:2, and the weight ratio of the disproportionation catalyst to the isomerization catalyst was 1:2.

The catalyst particles compact was dried at a drying temperature of 90° C. for 10 hours, and then calcined by a conventional process by: controlling the heating rate to be 5° C./min in the whole process, raising the temperature from room temperature to 550° C. in a muffle furnace, keeping the temperature for 4 h, to obtain catalyst particles, which particles were found to be broken in a fault and could not be used for reaction evaluation.

Example 11

Disproportionation catalyst powders with a composition of $WO_3/SiO_2$ (wherein $WO_3$ was used in an amount of 10 wt %) was mixed with silica sol at a weight ratio of 1:2 and granulated, tableted into a cylindrical catalyst layer A with 4.0 mm*2.0 mm. Magnesium oxide powders and hydroxypropyl methylcellulose were mixed at a weight ratio of 1:2, from which a cylindrical catalyst layer B was tableted and combined on one bottom surface of the catalyst layer A, to prepare a compact of cylindrical catalyst particles with 4.0 mm*6.0 mm, wherein the effective distance of active phases was 3 mm. The thickness ratio of the disproportionation catalyst layer A to the isomerization catalyst layer B was 1:2, and the weight ratio of the disproportionation catalyst to the isomerization catalyst was 1:2.

The catalyst particles compact was dried at a drying temperature of 90° C. for 10 hours and then calcined, where the calcination process was as follows: controlling the heating rate to be 1° C./min in the whole process, raising the temperature from room temperature to 300° C. in a nitrogen atmosphere, keeping the temperature for 6 h, raising again the temperature to 480° C., keeping temperature for 6 h, then shifting the atmosphere to an air atmosphere, raising the temperature to 550° C., keeping the temperature for 4 h, then shifting the atmosphere to the nitrogen atmosphere again, and keeping the temperature for 4 h, to obtain catalyst particles.

The catalyst particles prepared were loaded in a fixed bed reactor of Φ25 mm, and ethylene and butylene were used as feedstocks for disproportionation under the conditions of a weight space velocity of 1 $h^{-1}$, a reaction temperature of 200° C., and a reaction pressure of 5 MPa, and the results were shown in Table 1.

Example 12

Disproportionation catalyst powders with a composition of $WO_3/SiO_2$ (wherein $WO_3$ was used in an amount of 10 wt %) was mixed with silica sol at a weight ratio of 1:2 and granulated, tableted into a cylindrical catalyst layer A with 4.0 mm*2.0 mm. Magnesium oxide powders and hydroxypropyl methylcellulose were mixed at a weight ratio of 1:2, from which a cylindrical catalyst layer B was tableted and combined on one bottom surface of the catalyst layer A, to prepare a compact of cylindrical catalyst particles with 4.0 mm*6.0 mm, wherein the effective distance of active phases was 3 mm. The thickness ratio of the disproportionation catalyst layer A to the isomerization catalyst layer B was 1:2, and the weight ratio of the disproportionation catalyst to the isomerization catalyst was 1:2.

The catalyst particles compact was dried at a drying temperature of 90° C. for 10 hours and then calcined, where the calcination process was as follows: controlling the heating rate to be 1° C./min in the whole process, raising the temperature from room temperature to 300° C. in a nitrogen atmosphere, keeping the temperature for 6 h, raising again the temperature to 480° C., keeping temperature for 6 h, then shifting the atmosphere to an air atmosphere, raising the temperature to 550° C., keeping the temperature for 4 h, then shifting the atmosphere to the nitrogen atmosphere again, and keeping the temperature for 4 h, to obtain catalyst particles.

The catalyst particles prepared were loaded in a fixed bed reactor of Φ25 mm, and ethylene and butylene were used as feedstocks for disproportionation under the conditions of a weight space velocity of 30 $h^{-1}$, a reaction temperature of 450° C., and a reaction pressure of 0.1 MPa, and the results were shown in Table 1.

Comparative Example 1

Disproportionation catalyst powders with a composition of $WO_3/SiO_2$ (wherein $WO_3$ was used in an amount of 10 wt %) was mixed with silica sol at a weight ratio of 1:2 and granulated, tableted into a cylindrical catalyst particles A compact with 4.0 mm*5.0 mm. The catalyst particles compact was dried at a drying temperature of 90° C. for 10 hours and then calcined, where the calcination process was as follows: controlling the heating rate to be 1° C./min in the whole process, raising the temperature from room temperature to 300° C. in a nitrogen atmosphere, keeping the temperature for 6 h, raising again the temperature to 480° C., keeping temperature for 6 h, then shifting the atmosphere to an air atmosphere, raising the temperature to 550° C., keeping the temperature for 4 h, then shifting the atmosphere to the nitrogen atmosphere again, and keeping the temperature for 4 h, to obtain catalyst particles A.

Magnesium oxide powders and hydroxypropyl methylcellulose were mixed at a weight ratio of 1:2 and granulated, and tableted to prepare a catalyst particles B compact with 4.0 mm*5.0 mm. The catalyst particles compact was dried at a drying temperature of for 10 hours and then calcined, where the calcination process was as follows: controlling the heating rate to be 1° C./min in the whole process, raising the temperature from room temperature to 300° C. in a nitrogen atmosphere, keeping the temperature for 6 h, raising again the temperature to 480° C., keeping temperature for 6 h, then shifting the atmosphere to an air atmosphere, raising the temperature to 550° C., keeping the temperature for 4 h, then shifting the atmosphere to the nitrogen atmosphere again, and keeping the temperature for 4 h, to obtain catalyst particles B.

The two types of catalyst particles above were mechanically loaded in a fixed bed reactor of Φ25 mm, where the weight ratio of the disproportionation catalyst to the isomerization catalyst was 1:6. Ethylene and butylene were used as feedstocks for disproportionation under the conditions of a weight space velocity of 10 $h^{-1}$, a reaction temperature of 300° C., and a reaction pressure of 3 MPa, and the results were shown in Table 1.

Comparative Example 2

Disproportionation catalyst powders with a composition of $WO_3/SiO_2$ (wherein $WO_3$ was used in an amount of 10 wt %) was mixed with silica sol at a weight ratio of 1:2 and granulated, magnesium oxide powders and hydroxypropyl methylcellulose were mixed at a weight ratio of 1:2 and granulated, the disproportionation catalyst powders was mixed with the magnesium oxide powders at a weight ratio of 1:6, and tableted to prepare a catalyst particles B compact with 4.0 mm*5.0 mm.

The catalyst particles compact was dried at a drying temperature of 90° C. for 10 hours and then calcined, where the calcination process was as follows: controlling the heating rate to be 1° C./min in the whole process, raising the temperature from room temperature to 300° C. in a nitrogen atmosphere, keeping the temperature for 6 h, raising again the temperature to 480° C., keeping temperature for 6 h, then shifting the atmosphere to an air atmosphere, raising the temperature to 550° C., keeping the temperature for 4 h, then shifting the atmosphere to the nitrogen atmosphere again, and keeping the temperature for 4 h, to obtain catalyst particles. The catalyst particles above were loaded in a fixed bed reactor of Φ25 mm, and ethylene and butylene were used as feedstocks for disproportionation under the conditions of a weight space velocity of 10 $h^{-1}$, a reaction temperature of 300° C., and a reaction pressure of 3 MPa, and the results were shown in Table 1.

Comparative Example 3

Disproportionation catalyst powders with a composition of $WO_3/SiO_2$ (wherein $WO_3$ was used in an amount of 10 wt %) was mixed with silica sol at a weight ratio of 1:2 and granulated, magnesium oxide powders and hydroxypropyl methylcellulose were mixed at a weight ratio of 1:2 and granulated, the disproportionation catalyst powders was mixed with the magnesium oxide powders at a weight ratio of 1:6, and tableted to prepare a catalyst particles B compact with 4.0 mm*5.0 mm, wherein the magnesium oxide used was a non-flaky magnesium oxide, for which the SEM characterization was shown in FIG. 5.

The catalyst particles compact was dried at a drying temperature of 90° C. for 10 hours and then calcined, where the calcination process was as follows: controlling the heating rate to be 1° C./min in the whole process, raising the temperature from room temperature to 300° C. in a nitrogen atmosphere, keeping the temperature for 6 h, raising again the temperature to 480° C., keeping temperature for 6 h, then shifting the atmosphere to an air atmosphere, raising the temperature to 550° C., keeping the temperature for 4 h, then shifting the atmosphere to the nitrogen atmosphere again, and keeping the temperature for 4 h, to obtain catalyst particles. The catalyst particles above were loaded in a fixed bed reactor of Φ25 mm, and ethylene and butylene were used as feedstocks for disproportionation under the conditions of a weight space velocity of 10 $h^{-1}$, a reaction temperature of 300° C., and a reaction pressure of 3 MPa, and the results were shown in Table 1.

TABLE 1

| | Disproportionation catalyst + binder | Isomerization catalyst + binder | thickness ratio of the disproportionation catalyst layer to the isomerization catalyst layer | Conversion (%) | Stability |
|---|---|---|---|---|---|
| Ex. 1 | $SiO_2$/85 + $WO_3$/15 + alumina sol | CaO + polyvinyl alcohol | 1:1 | 57.2 | 750 |
| Ex. 2 | $SiO_2$/95 + $WO_3$/5 + alumina sol | BaO + polyvinyl alcohol | 1:5 | 57.0 | 751 |
| Ex. 3 | MCM-41/90 + $WO_3$/10 + silica sol | SrO + polyvinylpyrrolidone | 1:2 | 56.5 | 753 |
| Ex. 4 | SBA-15/90 + $WO_3$/10 + silica sol | MgO + hydroxypropyl cellulose | 1:1.5 | 61.3 | 805 |
| Ex. 5 | MSU/90 + $WO_3$/10 + silica sol | MgO + hydroxypropyl methylcellulose | 1:2 | 62.1 | 814 |
| Ex. 6 | $SiO_2$/90 + $WO_3$/10 + silica sol | MgO + hydroxypropyl methylcellulose | 1:2:1** | 70.4 | 820 |
| Ex. 7 | $SiO_2$/90 + $WO_3$/10 + silica sol | MgO + hydroxypropyl methylcellulose | 2:1:2*** | 71.0 | 822 |
| Ex. 8 | $SiO_2$/90 + $WO_3$/10 + silica sol | MgO + hydroxypropyl methylcellulose | 1:2 | 69.8 | 815 |
| Ex. 9 | $SiO_2$/90 + $WO_3$/10 + silica sol | MgO + hydroxypropyl methylcellulose | 1:1 | 60.3 | 641 |
| Ex. 10 | $SiO_2$/90 + $WO_3$/10 + silica sol | MgO + hydroxypropyl methylcellulose | 1:2 | — | — |
| Ex. 11 | $SiO_2$/90 + $WO_3$/10 + silica sol | MgO + hydroxypropyl methylcellulose | 1:2 | 67.5 | 805 |
| Ex. 12 | $SiO_2$/90 + $WO_3$/10 + silica sol | MgO + hydroxypropyl methylcellulose | 1:2 | 68.1 | 781 |
| C.E. 1 | $SiO_2$/90 + $WO_3$/10 + silica sol | MgO + hydroxypropyl methylcellulose | — | 52.1 | 630 |
| C.E. 2 | $SiO_2$/90 + $WO_3$/10 + silica sol + MgO + hydroxypropyl methylcellulose | | — | 59.1 | 628 |
| C.E. 3 | $SiO_2$/90 + $WO_3$/10 + silica sol | MgO + hydroxypropyl methylcellulose | 1:2 | 47.3 | 421 |

Note:
*stability referred to the duration under stable operation with catalyst conversion greater than 60%;
**The ratio of 1:2:1 in Example 6 referred to the thickness ratio of the disproportionation catalyst layer A, the isomerization catalyst layer B, and the disproportionation catalyst layer C;
***The ratio of 2:1:2 in Example 7 referred to the thickness ratio of the isomerization catalyst layer A, the disproportionation catalyst layer B, and the isomerization catalyst layer C.

The preferred embodiments of the present invention have been described above in detail, but the present invention is not limited thereto. Within the scope of the technical idea of the invention, many simple modifications can be made to the technical solution of the invention, including various technical features being combined in any other suitable way, and these simple modifications and combinations should also be regarded as the disclosure of the invention, and all fall within the scope of the invention.

The invention claimed is:
1. An integrated catalyst for olefin disproportionation, comprising a plurality of different active phases integrated together, and the relative position between two of the plurality of different active phases is kept substantially unchanged during the olefin disproportionation, wherein an effective distance between the respective bisecting surfaces of two adjacent active phases is 0.5-5 mm.

2. The integrated catalyst according to claim 1, wherein the different active phases are integrated by means selected from the group consisting of: filling each active phase into a container with a plurality of chambers, laminating the respective active phases, bonding the active phases, rolling the active phases in sequence, and coextruding the active phases.

3. The integrated catalyst according to claim 1, wherein the ratio of the effective distances occupied by two different active phases among the distances between the centers of gravity of two adjacent different active phases is 1:10 to 10:1.

4. The integrated catalyst according to claim 1, wherein the plurality of different active phases are alternated one or more times in a periodic arrangement.

5. The integrated catalyst according to claim 1, wherein, for two adjacent active phases, one active phase is a disproportionation catalyst and the other active phase is an isomerization catalyst, and a ratio between the effective distances occupied respectively by the adjacent disproportionation catalyst active phase and isomerization catalyst active phase is (1:1) to (1:5).

6. The integrated catalyst according to claim 1, wherein a displacement of the relative position between the two of the plurality of active phases during the olefin disproportionation reaction is 0 to 0.5 mm.

7. The integrated catalyst according to claim 1, wherein the catalyst is in the form of particles.

8. The integrated catalyst according to claim 7, wherein the catalyst particles have a total thickness of from 2.0 mm to 8.0 mm, and a radial length of 1.8 mm to 6.0 mm.

9. The integrated catalyst according to claim 7, wherein the catalyst particles are in a multi-layer structure having at least two layers.

10. The integrated catalyst according to claim 1, wherein the first active phase in the plurality of active phases is a disproportionation catalyst, which comprises, in parts by weight:
   85-95 parts of a support, and
   5-15 parts of tungsten oxide.

11. The integrated catalyst according to claim 10, wherein the support is $SiO_2$ or a mesoporous molecular sieve.

12. The integrated catalyst according to claim 1, wherein the second active phase of the plurality of active phases is an isomerization catalyst that is an alkaline earth metal oxide selected from the group consisting of calcium oxide, magnesium oxide, strontium oxide, and barium oxide.

13. The integrated catalyst according to claim 12, wherein the second active phase is-preferably magnesium oxide in the form of polycrystalline hexagonal flakes.

14. The integrated catalyst according to claim 13, wherein the magnesium oxide in the form of polycrystalline hexagonal flakes is prepared according to a method comprising:
   1) preparing a solution of soluble magnesium salt with a concentration of 5-20%, heating to 40-80° C. and stirring to be homogeneous;
   2) adding a surfactant and a complexing agent, wherein the molar ratio of the surfactant to magnesium ions of the magnesium salt is 0.5-3%, and the molar ratio of the complexing agent to the magnesium ions of the magnesium salt is 1-8%;
   3) adding a precipitator, wherein the molar ratio of the precipitator to magnesium ions is 2:1-5:1;
   4) washing the precipitate obtained in the step 3) with water, washing with absolute ethanol, and drying at 70-90° C. for 8-12 h; and
   5) calcining the product obtained in the step 4), controlling the heating rate to be 5-15° C./min, and calcining at 400-520° C. for 3-6h.

15. The integrated catalyst according to claim 14, wherein the soluble magnesium salt is selected from magnesium sulfate, magnesium chloride and magnesium carbonate; the surfactant is a molecular surfactant; the complexing agent is selected from ethylenediamine tetraacetic acid and nitrilotriacetic acid; and the precipitator is selected from aqueous ammonia and urea at a concentration of 5-30%.

16. A process of preparing the integrated catalyst according to claim 1, comprising:
   1) providing powders of the plurality of different active phases;
   2) molding the powders of the plurality of different active phases from step 1) to form a plurality of active phases; and
   3) integrating the plurality of active phases together by filling each of the plurality of active phases into a container having a plurality of chambers respectively; laminating the plurality of active phases; bonding the plurality of active phases; rolling the plurality of active phases in sequence; or co-extruding the plurality of active phases.

17. The process of claim 16, wherein the particle size of the powders is 8 to 400 mesh.

18. The process according to claim 16, comprising:
   1) providing a first powder of a first active phase and a second powder of a second active phase;
   2) molding the first powder to prepare a catalyst layer A;
   3) combining a catalyst layer B formed by the second powders on a bottom surface of the catalyst layer A to form a compact;
   4) optionally, combining other catalyst layer(s) on the compact obtained in step 3); and
   5) drying and calcining the compact having two or more layers to obtain the integrated catalyst.

19. The process according to claim 18, wherein the molding step is by tabletting or rolling.

20. The process according to claim 18, wherein the first active phase is a disproportionation catalyst comprising the first powder and a first binder, and the first binder is at least one selected from silica sol and aluminum sol; and/or the second active phase is an isomerization catalyst comprising the second powder and a second binder, and the second binder is at least one selected from polyvinyl alcohol, hydroxymethyl cellulose, hydroxypropyl methyl cellulose, hydroxypropyl cellulose, and polyvinylpyrrolidone.

21. The process according to claim 20, wherein a weight ratio of the first powder to the first binder is 3:1-1:2; and/or a weight ratio of the second powder to the second binder is 3:1-1:2.

22. The process according to claim 18, wherein the drying in step 5) is carried out under conditions of: drying at a temperature of 80-110°C. for 8-15 hours; and the calcining in step 5) is as follows: controlling the heating rate to be 0.5-1.5°C./min in the whole process, raising the temperature from room temperature to 280-320°C. in an inert atmosphere, keeping the temperature for 4-8 h, raising again the temperature to 460-500°C., keeping temperature for 4-8 h, then shifting the atmosphere to an oxygen-containing atmosphere, raising the temperature to 530-570°C., keeping the temperature for 4-8 h, then shifting the atmosphere to the inert atmosphere again, and keeping the temperature for 4-8 h.

23. A method for disproportionation of olefins, comprising contact the olefins with the integrated catalyst according to claim 1.

24. The integrated catalyst according to claim 11, wherein the mesoporous molecular sieve is selected from the group consisting of an MCM molecular sieve, an SBA molecular sieve, an HMS molecular sieve, and an MSU molecular sieve.

25. The integrated catalyst according to claim 12, wherein the isomerization catalyst is magnesium oxide.

26. The integrated catalyst according to claim 15, wherein the surfactant is polyethylene glycol or P123.

\* \* \* \* \*